US009170455B2

(12) United States Patent
Kuo et al.

(10) Patent No.: US 9,170,455 B2
(45) Date of Patent: Oct. 27, 2015

(54) JOINED BACK PANEL STRUCTURE OF DISPLAY DEVICE

(75) Inventors: Yicheng Kuo, Guangdong (CN); Yuchun Hsiao, Guangdong (CN); Chong Huang, Guangdong (CN); Jiahe Cheng, Guangdong (CN); Chengwen Que, Guangdong (CN); Quan Li, Guangdong (CN); Liuyang Yang, Guangdong (CN)

(73) Assignee: SHENZHEN CHINA STAR OPTOELECTRONICS TECHNOLOGY CO., LTD., Shenzhen, Guangdong Province (CN)

(*) Notice: Subject to any disclaimer, the term of this patent is extended or adjusted under 35 U.S.C. 154(b) by 569 days.

(21) Appl. No.: 13/381,933

(22) PCT Filed: Nov. 24, 2011

(86) PCT No.: PCT/CN2011/082904
§ 371 (c)(1),
(2), (4) Date: Dec. 31, 2011

(87) PCT Pub. No.: WO2013/071637
PCT Pub. Date: May 23, 2013

(65) Prior Publication Data
US 2013/0126451 A1    May 23, 2013

(30) Foreign Application Priority Data

Nov. 18, 2011  (CN) .......................... 2011 1 0367559

(51) Int. Cl.
*G02F 1/1335* (2006.01)

(52) U.S. Cl.
CPC .................. *G02F 1/133608* (2013.01)

(58) Field of Classification Search
USPC ............................................. 349/58
See application file for complete search history.

(56) References Cited

U.S. PATENT DOCUMENTS

2005/0168954 A1* 8/2005 Kim ........................... 361/725
2007/0229731 A1* 10/2007 Lan et al. ..................... 349/64

FOREIGN PATENT DOCUMENTS

CN       101604098 A     12/2009
CN       202018551 U     10/2011

* cited by examiner

*Primary Examiner* — Lauren Nguyen
(74) *Attorney, Agent, or Firm* — Cheng-Ju Chiang

(57) ABSTRACT

The present invention provides a joined back panel structure of display device, which includes: a first mounting member that is L-shaped and a second mounting member, a third mounting member, a fourth mounting member, and a fifth mounting member that are linear, ends of the first mounting member, the second mounting member, and the third mounting member are sequentially connected to form an enclosed outer frame, the fourth mounting member being disposed inside the outer frame and having two ends connected to the outer frame, the fifth mounting member being disposed inside the outer frame and having two ends connected to the outer frame so as to form a hollow back panel. The outer frame of the present invention has an improved structural strength and low cast and is easy to manufacture. It is possible to join mounting members that are manufactured by the same mold, after being properly cut, in order to form back panels of various sizes so that the production mold of back panel can be shared to thereby reduce material cost and mold cost.

9 Claims, 2 Drawing Sheets

JOINED BACK PANEL STRUCTURE OF DISPLAY DEVICE

BACKGROUND OF THE INVENTION

1. Field of the Invention

The present invention relates to a joined back panel structure of display device, and in particular to a joined back panel structure applicable to a backlight module of a TFT-LCD (Thin Film Transistor Liquid Crystal Display) display device.

2. The Related Arts

A liquid crystal display is commonly abbreviated as LCD, and the operation principle is placing liquid crystal molecules between two parallel pieces of glass. A plurality of tiny vertical and horizontal conductive wires is arranged between the pieces of glass and change of direction of the liquid crystal molecules is controlled through application of electricity so as to refract light outwards to form an image. The liquid crystal display is now widely used due to various advantages of being compact in size, saving of power, and being free of radiations. A backlight module is an important component of the liquid crystal display and a known backlight module generally comprises an optic film, a light guide plate, a backlight unit, and a back panel. To meet the requirements of large-sized liquid crystal display devices, the known back panel is generally a unitary back panel that is integrally formed by means of metal stamping or plastic injection molding. However, the unitary back panel increases the weight of the display device, needs more material for production, and may cause a higher cost. Further, the large-sized back panel requires use of large-sized and high-cost stamping facility in the manufacturing process, and also, the size of mold used in the back panel manufacturing process is large, the structure is complicated and thus the cost is high.

To overcome the above problems, Chinese Patent No. CN201672468 discloses a structure of rear-side back panel for backlight module, which uses a plurality of mounting strips joined together to form the rear-side back panel with the mounting strips intersecting each other. However, the rear-side back panel disclosed in this patent uses a large number of mounting strips and the connection and mounting is complicated. Further, it requires separate manufacturing of these mounting strips, leading to an increase of secondary processing. Further, the structural strength of the back panel, especially the structural strength of the outer frame, is insufficient, making it not possible to meet the needs of using the back panel.

SUMMARY OF THE INVENTION

An objective of the present invention is to provide a joined back panel of display device, which is formed by joining an L-shaped mounting member and linear mounting members and the outer frame has an improved structural strength and low cost and is easy to manufacture, and it is possible join mounting members that are manufactured by the same mold, after being properly cut, in order to form back panels of various sizes so that the production mold of back panel can be shared to thereby reduce material cost and mold cost.

Another objective of the present invention is to provide a joined back panel structure of display device, of which mounting members are made of materials of high thermal conductivity and materials of low cost so as to facilitate dissipation of heat and having a low cost.

A further objective of the present invention is to provide a joined back panel structure of display device of which connections between mounting members adopt a structure of reinforcing ribs so as to improve the strength of the joined portions.

The present invention provides a joined back panel structure of display device, which comprises: a first mounting member that is L-shaped and a second mounting member, a third mounting member, a fourth mounting member, and a fifth mounting member that are linear, ends of the first mounting member, the second mounting member, and the third mounting member being sequentially connected to form an enclosed outer frame, the fourth mounting member being disposed inside the outer frame and having two ends respectively connected to the outer frame, the fifth mounting member being disposed inside the outer frame and having two ends respectively connected to the outer frame so as to form a hollow back panel.

The mounting member of the outer frame that corresponds to location of a light source of a backlight module is made of high thermal conduction materials.

The first mounting member and the third mounting member are made of a high thermal conductivity material and the second mounting member, the fourth mounting member, and the fifth mounting member are made of galvanized steel plate or plastics.

The third mounting member is made of a high thermal conductivity material and the first mounting member, the second mounting member, the fourth mounting member, and the fifth mounting member are made of galvanized steel plate or plastics.

The first mounting member is made of a high thermal conductivity material and the second mounting member, the third mounting member, the fourth mounting member, and the fifth mounting member are made of galvanized steel plate or plastics.

The high thermal conductivity material comprises aluminum.

The first mounting member comprises a top section and a left side section, the second mounting member being connected to the left side section of the first mounting member, the third mounting member being connected to the top section of the first mounting member, two ends of the fourth mounting member and two ends of the fifth mounting member being respectively connected to the top section and the second mounting member, the fourth mounting member and the fifth mounting member being parallel to each other.

The fourth mounting member and the fifth mounting member are of identical structure.

The first mounting member forms raised first reinforcing ribs at portions thereof that are joined to the second mounting member, the third mounting member, the fourth mounting member, and the fifth mounting member; the second mounting member forms raised second reinforcing ribs at portions thereof that are joined to the first mounting member, the third mounting member, the fourth mounting member, and the fifth mounting member; the second reinforcing rib and the first reinforcing rib are set to overlap each other; the third mounting member forms raised third reinforcing ribs at portions thereof that are joined to the first mounting member and the second mounting member; the third reinforcing rib are respectively set to overlap the first reinforcing rib and the second reinforcing rib; the fourth mounting member forms raised fourth reinforcing ribs at portions thereof that are joined to the first mounting member and the second mounting member, the fourth reinforcing ribs being set to overlap the first reinforcing rib and the second reinforcing rib; the fifth mounting member forms raised fifth reinforcing ribs at portions thereof that are joined to the first mounting member and the second mounting member, the fifth reinforcing ribs being set to overlap the first reinforcing rib and the second reinforcing rib.

The connections between the first mounting member and the second mounting member and the third mounting member, between the fourth mounting member and the first mounting member and the second mounting member, and between the fifth mounting member and the first mounting member and the second mounting member are realized through riveting, bolting, or laser wielding.

The efficacy of the present invention is that the present invention provides a joined back panel of display device, which is formed by joining an L-shaped mounting member and linear mounting members and the outer frame has an improved structural strength and low cost and is easy to manufacture, and it is possible join mounting members that are manufactured by the same mold, after being properly cut, in order to form back panels of various sizes so that the production mold of back panel can be shared to thereby reduce material cost and mold cost; further, the mounting members are made of materials of high thermal conduction and materials of low cost so as to facilitate dissipation of heat and having a low cost; further, the connections between mounting members adopt a structure of reinforcing ribs so as to improve the strength of the joined portions.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description will be given to a preferred embodiment of the present invention and the drawings thereof.

Figure 1:
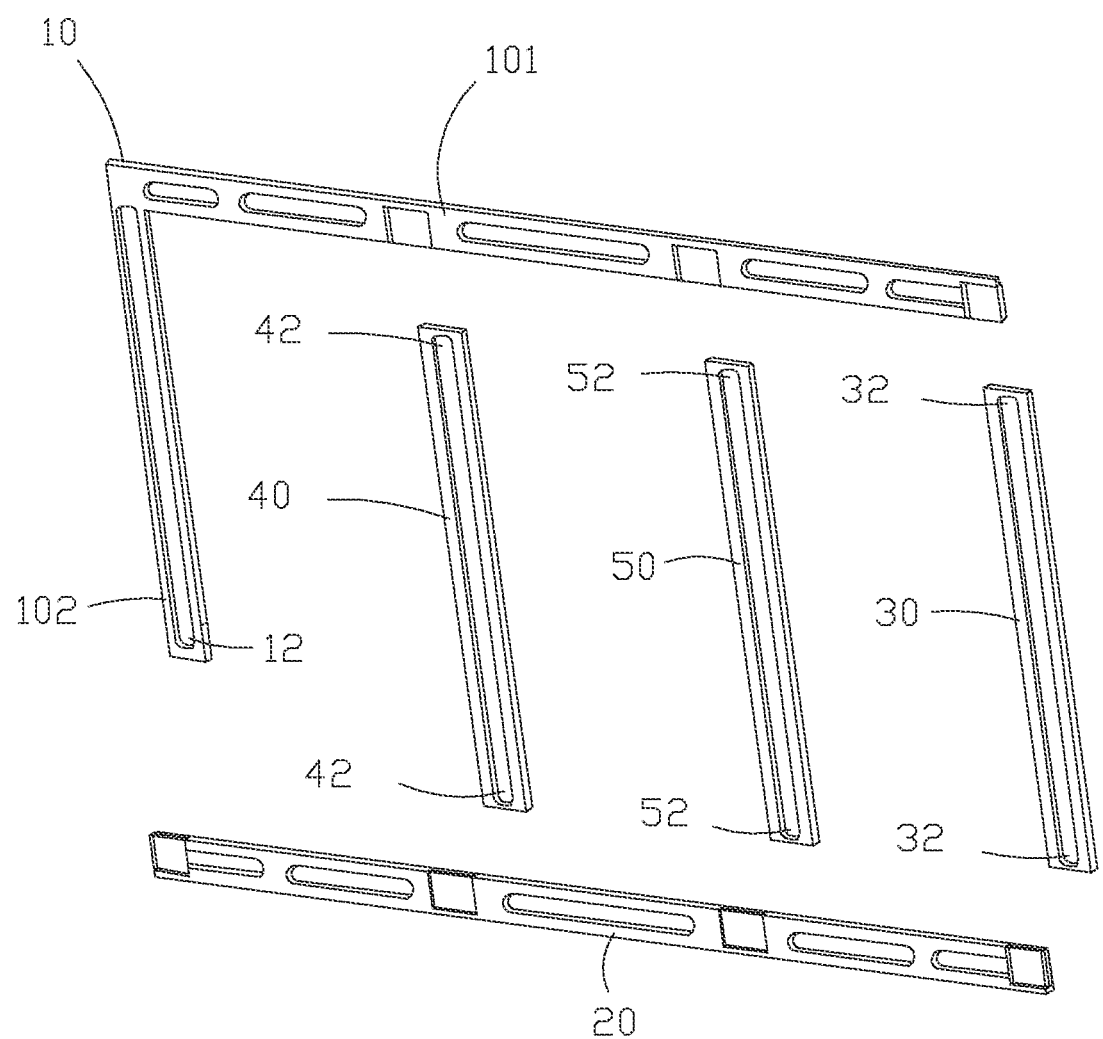
FIG. 1 is an exploded view showing a joined back panel of display device according to the present invention.
Figure 2:
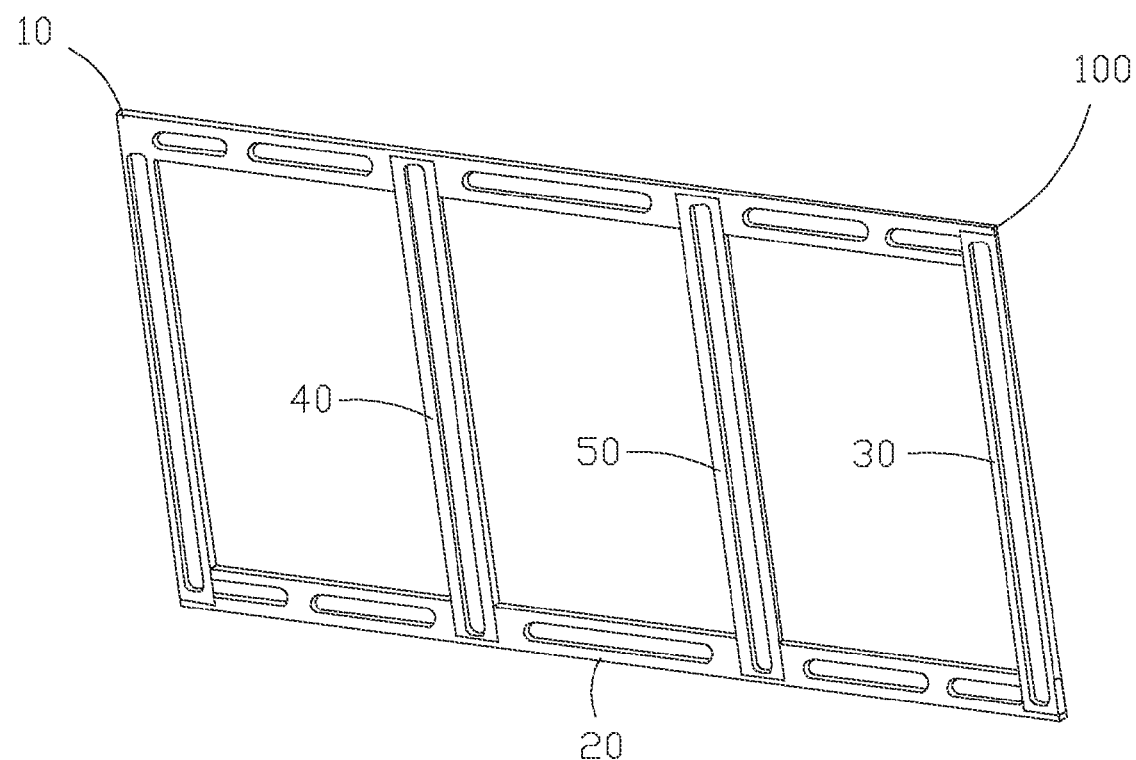
FIG. 2 is an assembled view of FIG. 1.
Figure 3:
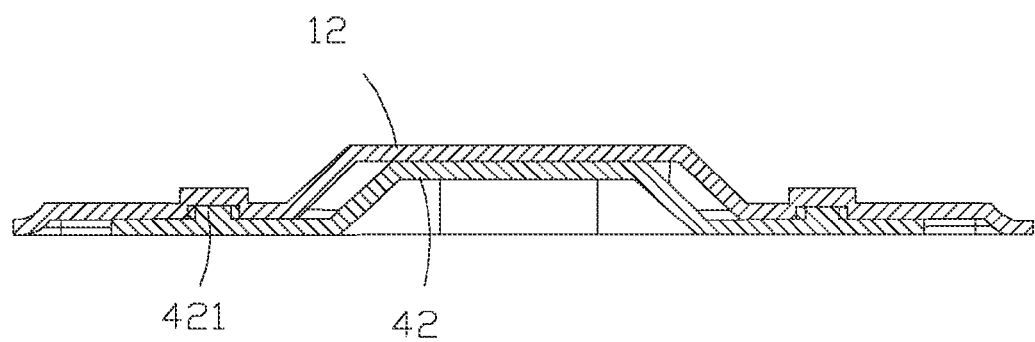
FIG. 3 is a cross-sectional view showing overlapping first reinforcing rib and third reinforcing rib at a connection between a first mounting member and a third mounting member.

As shown in FIGS. 1-3, the present invention provides a joined back panel structure of display device, which comprises: a first mounting member 10 that is L-shaped, and a second mounting member 20, a third mounting member 30, a fourth mounting member 40, and a fifth mounting member 50 that are each straight linear. Ends of the first mounting member 10, the second mounting member 20, and the third mounting member 30 are sequentially joined to form an enclosed outer frame 100. The fourth mounting member 40 is disposed inside the outer frame and has two ends respectively connected to the outer frame 100. The fifth mounting member 50 is disposed inside the outer frame and has two ends respectively connected to the outer frame 100, so as to form a hollow back panel. The back panel of the present invention is formed by joining L-shaped and linear mounting members and the outer frame has an improved structural strength and a low cost and is easy to manufacture. It is possible to join mounting members that are manufactured by the same mold, after being properly cut, in order to form back panels of various sizes. These various sizes of back panel are applicable to liquid crystal display device of various sizes, such as 32", 46", and lager or smaller sizes, so that the production mold can be shared by various back panels of different sizes. Also, as a preferred embodiment of the present invention, the fourth mounting member 40 and the fifth mounting member 50 are of identical structure, whereby the fourth mounting member 40 and the fifth mounting member 50 may share the same production mold, making it possible to greatly reduce material cost and mold cost for making a hollow back panel through joining operation.

The present invention uses the first mounting member 10 that is L-shaped and the second mounting member 20 and the third mounting member 30 to form an outer frame 100 in order to provide the outer frame 100 with improved frame structure and thus overcome the deficiency of insufficient strength for joined back panels. Connections between the first mounting member 10 and the second mounting member 20 and the third mounting member 30, between the fourth mounting member 40 and the first mounting member 10 and the second mounting member 20, and between the fifth mounting member 50 and the first mounting member 10 and the second mounting member 20 can be realized through for example riveting, bolting, or laser welding. As a preferred embodiment of the present invention, the first mounting member 10 comprises a top section 101 and a left side section 102 that are connected to each other. The second mounting member 20 is connected to the left side section 102 of the first mounting member and the third mounting member 30 is connected to the top section 101 of the first mounting member. The two ends of fourth mounting member 40 and the two ends of the fifth mounting member 50 are respectively connected to the top section 101 and the second mounting member 20. The fourth mounting member 40 and the fifth mounting member 50 are parallel to each other.

Preferably, each of the mounting members of the present invention may further comprise the same reinforcing rib at the connections thereof to improve the strength of the back panel. The first mounting member 10 forms raised first reinforcing ribs 12 at the portions thereof that are joined to the second mounting member 20, the third mounting member 30, the fourth mounting member 40, and the fifth mounting member 50. The second mounting member 20 forms raised second reinforcing ribs (not shown) at the portions thereof that are joined to the first mounting member 10, the third mounting member 30, the fourth mounting member 40, and the fifth mounting member 50. The second reinforcing rib and the first reinforcing rib 12 are set to overlap each other. The third mounting member 30 forms raised third reinforcing ribs 32 at portions thereof that are joined to the first mounting member 10 and the second mounting member 20. The third reinforcing ribs 32 are respectively set to overlap the first reinforcing rib 12 and the second reinforcing rib. The fourth mounting member 30 forms raised fourth reinforcing ribs 42 at portions thereof that are joined to the first mounting member 10 and the second mounting member 20. The fourth reinforcing ribs 42 are respectively set to overlap the first reinforcing rib 12 and the second reinforcing rib. The fifth mounting member 50 forms raised fourth reinforcing ribs 52 at portions thereof that are joined to the first mounting member 10 and the second mounting member 20. The fifth reinforcing ribs 52 are respectively set to overlap the first reinforcing rib 12 and the second reinforcing rib. The present invention uses the structure of reinforcing ribs to further improve the strength of the back panel at the joined portions and to further overcome the deficiency of insufficient strength for joined back panel so as to meet the needs of various designs. Connections between the mounting members can be realized through riveting, bolting, or laser welding. As a preferred embodiment of the present invention, the connection between the mounting members is done with riveting. Receiving cavities are formed on opposite sides of the first reinforcing rib 12 and rivet heads 421 on the opposite sides of the fourth reinforcing rib 42 are received in the receiving cavities (as shown in FIG. 3).

Further, according to requirements, the present invention is applicable to using different materials to make mounting members at different locations, and the mounting member of the outer frame 1 corresponding to the location of backlight source of a backlight module is made of a high thermal conductivity material, while the remaining mounting members of the outer frame and the fourth mounting member and the fifth mounting are made of galvanized steel plate or plastic material in order to meet the needs for heat dissipation and to minimize the product cost. Specifically, when the back panel of the present invention is applicable to a backlight module that has light incidence from opposite left and right sides, the first mounting member 10 and the third mounting member 30 are made of a high thermal conductivity material. Since the first mounting member 10 is L-shaped, the surface area for heat dissipation is increased so as to facilitate dissipation of heat. The high thermal conductivity materials applicable in the present invention are thermal conductive materials having a thermal conductance (thermal conductivity) W/(m·k) that is at least 200. A preferred material is aluminum. Further, the second mounting member 20, the fourth mounting member 30, and fifth mounting member 40 are made of galvanized steel plate or plastic materials to reduce the product cost but maintain a predetermined strength of the back panel. As another preferred embodiment of the present invention, when the back panel is applied to a backlight module having light incidence on either left or right side, the first mounting member 10 is made of a high thermal conductivity material, while the second mounting member 20, the third mounting member 30, the fourth mounting member 40, and the fifth mounting member 50 are made of galvanized steel plate or plastics to increase the surface area for heat dissipation so as to facilitate heat dissipation; or alternatively, the third mounting member 30 is made of a high thermal conductivity material, while the first mounting member 10, the second mounting member 20, the fourth mounting member 40, and the fifth mounting member 50 are respectively made of galvanized steel plate or plastics. Since the third mounting member 30 is linear, it saves the cost to some extents. Further, when the back panel is applied to a backlight module having light incidence from either one or both of the top and bottom sides, the selection of materials for the mounting members is similar to those associated with the light incidence from both left and right sides, and repeated description will be omitted here.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A joined back panel structure of a display device, which comprises a first mounting member that is an integrally-formed, unitary L-shaped member and a second mounting member, a third mounting member, a fourth mounting member, and a fifth mounting member that are linear, ends of the first mounting member, the second mounting member, and the third mounting member being sequentially connected to form an enclosed outer frame, which achieves structural stability though jointing the L-shape of the first mounting member, the fourth mounting member being disposed inside the outer frame and having two ends respectively connected to the outer frame, the fifth mounting member being disposed inside the outer frame and having two ends respectively connected to the outer frame so as to form a hollow back panel;

wherein the first mounting member forms raised first reinforcing ribs at portions thereof that each has a surface that is raised and an opposite surface that is recessed correspondingly to form the first reinforcing rib to be joined to the second mounting member, the third mounting member, the fourth mounting member, and the fifth mounting member;

wherein the second mounting member forms raised second reinforcing ribs at portions thereof that each has a surface that is raised and an opposite surface that is recessed correspondingly to form the second reinforcing rib to be joined to the first mounting member, the third mounting member, the fourth mounting member, and the fifth mounting member;

wherein the second reinforcing rib and the first reinforcing rib are set to overlap each other by having one of the first and second reinforcing ribs received in the recess of the other one of the first and second reinforcing ribs;

wherein the third mounting member forms raised third reinforcing ribs at portions thereof that each has a surface that is raised and an opposite surface that is recessed correspondingly to form the third reinforcing rib to be joined to the first mounting member and the second mounting member, and the third reinforcing ribs are respectively set to overlap the first reinforcing rib and the second reinforcing rib by having one of the third reinforcing rib and the first or second reinforcing rib received in the recess of the other one of the third reinforcing rib and the first or second reinforcing rib;

wherein the fourth mounting member forms raised fourth reinforcing ribs at portions thereof that each has a surface that is raised and an opposite surface that is recessed correspondingly to form the fourth reinforcing rib to be joined to the first mounting member and the second mounting member, the fourth reinforcing ribs being set to overlap the first reinforcing rib and the second reinforcing rib by having one of the fourth reinforcing rib and the first or second reinforcing rib received in the recess of the other one of the fourth reinforcing rib and the first or second reinforcing rib; and wherein the fifth mounting member forms raised fifth reinforcing ribs at portions thereof that each has a surface that is raised and an opposite surface that is recessed correspondingly to form the fifth reinforcing rib to be joined to the first mounting member and the second mounting member, the fifth reinforcing ribs being set to overlap the first reinforcing rib and the second reinforcing rib by having one of the fifth reinforcing rib and the first or second reinforcing rib received in the recess of the other one of the fifth reinforcing rib and the first or second reinforcing rib.

2. The joined back panel structure of a display device as claimed in claim 1, wherein the mounting member of the outer frame that corresponds to a location of a light source of a backlight module is made of high thermal conduction materials.

3. The joined back panel structure of a display device as claimed in claim 2, wherein the first mounting member and the third mounting member are made of a high thermal conductivity material and the second mounting member, the fourth mounting member, and the fifth mounting member are made of galvanized steel plate or plastics.

4. The joined back panel structure of a display device as claimed in claim 2, wherein the third mounting member is made of a high thermal conductivity material and the first mounting member, the second mounting member, the fourth mounting member, and the fifth mounting member are made of galvanized steel plate or plastics.

5. The joined back panel structure of a display device as claimed in claim 2, wherein the first mounting member is made of a high thermal conductivity material and the second mounting member, the third mounting member, the fourth mounting member, and the fifth mounting member are made of galvanized steel plate or plastics.

6. The joined back panel structure of a display device as claimed in claim 2, wherein the high thermal conductivity material comprises aluminum.

7. The joined back panel structure of a display device as claimed in claim 1, wherein the first mounting member comprises a top section and a left side section, the second mounting member being connected to the left side section of the first mounting member, the third mounting member being connected to the top section of the first mounting member, two ends of the fourth mounting member and two ends of the fifth mounting member being respectively connected to the top section and the second mounting member, the fourth mounting member and the fifth mounting member being parallel to each other.

8. The joined back panel structure of a display device as claimed in claim 7, wherein the fourth mounting member and the fifth mounting member are of identical structure.

9. The joined back panel structure of a display device as claimed in claim 1, wherein the connections between the first mounting member and the second mounting member and the third mounting member, between the fourth mounting member and the first mounting member and the second mounting member, and between the fifth mounting member and the first mounting member and the second mounting member are realized through riveting, bolting, or laser welding.

* * * * *